US012659849B2

(12) United States Patent
Wang et al.

(10) Patent No.: US 12,659,849 B2
(45) Date of Patent: Jun. 16, 2026

(54) CELL SELECTION USING MULTIPLE FACTORS

(71) Applicant: QUALCOMM Incorporated, San Diego, CA (US)

(72) Inventors: Shanshan Wang, San Diego, CA (US); Arvind Vardarajan Santhanam, San Diego, CA (US); Yongle Wu, San Diego, CA (US); Sindhu Satyan, San Diego, CA (US); Daniel Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/603,620

(22) Filed: Mar. 13, 2024

(65) Prior Publication Data

US 2024/0224173 A1      Jul. 4, 2024

Related U.S. Application Data

(62) Division of application No. 17/305,133, filed on Jun. 30, 2021, now Pat. No. 11,991,625.

(51) Int. Cl.
*H04W 36/00*          (2009.01)
*H04W 24/08*          (2009.01)
*H04W 48/20*          (2009.01)

(52) U.S. Cl.
CPC ........... *H04W 48/20* (2013.01); *H04W 24/08* (2013.01); *H04W 36/00837* (2018.08); *H04W 36/00838* (2023.05); *H04W 36/008375* (2023.05)

(58) Field of Classification Search
None
See application file for complete search history.

(56) References Cited

U.S. PATENT DOCUMENTS

| | | | |
|---|---|---|---|
| 2006/0251023 A1* | 11/2006 | Choi ................... | H04W 36/302 |
| | | | 370/331 |
| 2008/0214174 A1 | 9/2008 | Palenius | |
| 2015/0327133 A1 | 11/2015 | Yiu et al. | |
| 2021/0266801 A1* | 8/2021 | Shah ................... | H04B 17/336 |
| 2023/0007577 A1 | 1/2023 | Wang | |
| 2023/0224788 A1 | 7/2023 | Chen | |

FOREIGN PATENT DOCUMENTS

CN            104469861 A          3/2015

OTHER PUBLICATIONS

International Search Report and Written Opinion—PCT/US2022/073227—ISA/EPO—Oct. 10, 2022.

* cited by examiner

*Primary Examiner* — Suhail Khan
(74) *Attorney, Agent, or Firm* — Harrity & Harrity LLP

(57) ABSTRACT

Various aspects of the present disclosure generally relate to wireless communication. In some aspects, a user equipment (UE) may perform measurements on a plurality of cells. The UE may order the plurality of cells based at least in part on multiple factors including at least a cell selection condition, the cell selection condition indicating a threshold for the measurement for cell selection. The UE may select, based at least in part on the ordering, a cell from the plurality of cells. The UE may camp on the selected cell. Numerous other aspects are provided.

20 Claims, 9 Drawing Sheets

700 ⟶

710 — Select a first cell for camping based at least in part on a measurement associated with the first cell satisfying a cell selection condition 720 — Camp on the first cell 730 — Detect that a reselection condition is satisfied for the first cell, the reselection condition being based at least in part on one or more factors 740 — Camp on a second cell based at least in part on the one or more factors of the reselection condition

400

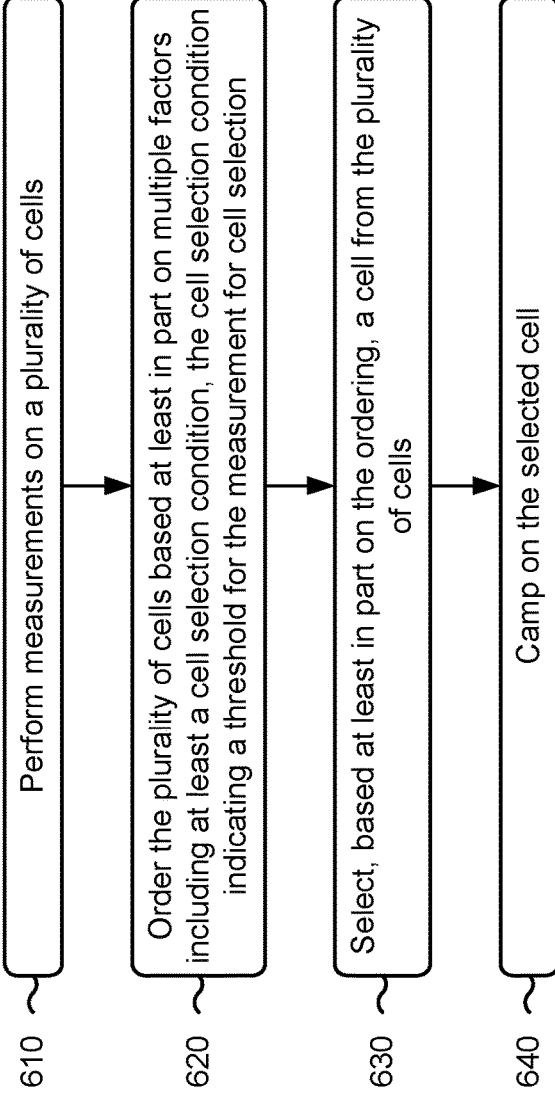

610 Perform measurements on a plurality of cells

620 Order the plurality of cells based at least in part on multiple factors including at least a cell selection condition, the cell selection condition indicating a threshold for the measurement for cell selection 630 Select, based at least in part on the ordering, a cell from the plurality of cells 640 Camp on the selected cell

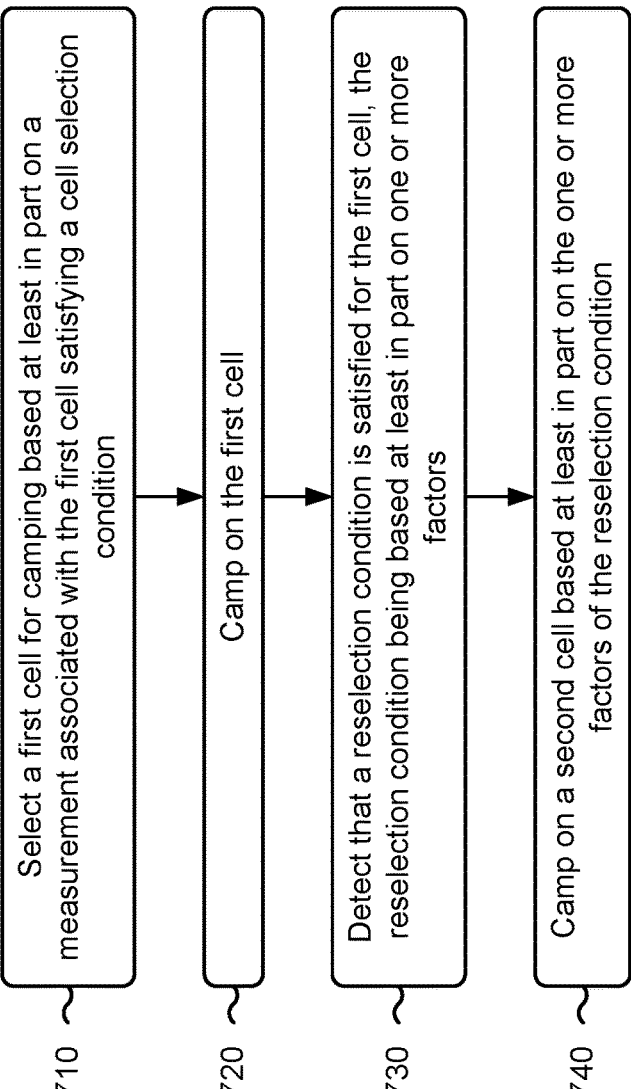

710   Select a first cell for camping based at least in part on a measurement associated with the first cell satisfying a cell selection condition 720   Camp on the first cell 730   Detect that a reselection condition is satisfied for the first cell, the reselection condition being based at least in part on one or more factors 740   Camp on a second cell based at least in part on the one or more factors of the reselection condition

CELL SELECTION USING MULTIPLE FACTORS

RELATED APPLICATION

This application is a divisional of U.S. patent application Ser. No. 17/305,133, filed Jun. 30, 2021, which is incorporated herein by reference in its entirety.

FIELD OF THE DISCLOSURE

Aspects of the present disclosure generally relate to wireless communication and specifically, to techniques and apparatuses for cell selection using multiple factors.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Cell selection is the process of searching for a suitable cell of a selected public land mobile network (PLMN), selecting a cell to provide available services, and monitoring a control channel of the cell. A UE that has selected a cell and that is monitoring the control channel of the cell is said to be "camped" on the cell. The UE may register on a cell on which the UE has camped. Camping enables the UE to receive system information from the PLMN, establish or resume a radio resource control (RRC) connection via the cell, and receive paging. A UE may select a suitable cell based at least in part on a set of cell selection criteria, such as a measurement threshold, a priority of the cell, and so on.

For example, the UE may search cells on frequencies identified by an acquisition database until the UE identifies a cell that satisfies the set of cell selection criteria, and may camp on the identified cell. Such an approach may lead the UE to identify a cell that is suitable but not ideal. For example, the cell may be weaker than other nearby cells, may have a narrow bandwidth, or may be associated with a negative trend in signal strength.

SUMMARY

Some aspects described herein relate to a method of wireless communication performed by a user equipment (UE). The method may include performing measurements on a plurality of cells. The method may include ordering the plurality of cells based at least in part on multiple factors including at least a cell selection condition, the cell selection condition indicating a threshold for the measurement for cell selection. The method may include selecting, based at least in part on the ordering, a cell from the plurality of cells. The method may include camping on the selected cell.

Some aspects described herein relate to a method of wireless communication performed by a UE. The method may include selecting a first cell for camping based at least in part on a measurement associated with the first cell satisfying a cell selection condition. The method may include camping on the first cell. The method may include detecting that a reselection condition is satisfied for the first cell, the reselection condition being based at least in part on one or more factors. The method may include camping on a second cell based at least in part on the one or more factors of the reselection condition.

Some aspects described herein relate to a non-transitory computer-readable medium that stores a set of instructions for wireless communication by a UE. The set of instructions, when executed by one or more processors of the UE, may cause the UE to perform measurements on a plurality of cells. The set of instructions, when executed by one or more processors of the UE, may cause the UE to order the plurality of cells based at least in part on multiple factors including at least a cell selection condition, the cell selection condition indicating a threshold for the measurement for cell selection. The set of instructions, when executed by one or more processors of the UE, may cause the UE to select, based at least in part on the ordering, a cell from the plurality of cells. The set of instructions, when executed by one or more processors of the UE, may cause the UE to camp on the selected cell.

Some aspects described herein relate to a non-transitory computer-readable medium that stores a set of instructions for wireless communication by a UE. The set of instructions, when executed by one or more processors of the UE, may cause the UE to select a first cell for camping based at least in part on a measurement associated with the first cell satisfying a cell selection condition. The set of instructions, when executed by one or more processors of the UE, may cause the UE to camp on the first cell. The set of instructions, when executed by one or more processors of the UE, may cause the UE to detect that a reselection condition is satisfied for the first cell, the reselection condition being based at least in part on one or more factors. The set of instructions, when executed by one or more processors of the UE, may cause the UE to camp on a second cell based at least in part on the one or more factors of the reselection condition.

Some aspects described herein relate to an apparatus for wireless communication. The apparatus may include means for performing measurements on a plurality of cells. The apparatus may include means for ordering the plurality of cells based at least in part on multiple factors including at least a cell selection condition, the cell selection condition indicating a threshold for the measurement for cell selection. The apparatus may include means for selecting, based at least in part on the ordering, a cell from the plurality of cells. The apparatus may include means for camping on the selected cell.

Some aspects described herein relate to an apparatus for wireless communication. The apparatus may include means for selecting a first cell for camping based at least in part on a measurement associated with the first cell satisfying a cell selection condition. The apparatus may include means for camping on the first cell. The apparatus may include means for detecting that a reselection condition is satisfied for the first cell, the reselection condition being based at least in part on one or more factors. The apparatus may include means for camping on a second cell based at least in part on the one or more factors of the reselection condition.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to perform measurements on a plurality of cells. The processor-readable code, when executed by the at least one processor, may be configured to cause the user equipment to order the plurality of cells based at least in part on multiple factors including at least a cell selection condition, the cell selection condition indicating a threshold for the measurement for cell selection. The processor-readable code, when executed by the at least one processor, may be configured to cause the user equipment to select, based at least in part on the ordering, a cell from the plurality of cells. The processor-readable code, when executed by the at least one processor, may be configured to cause the user equipment to camp on the selected cell.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to select a first cell for camping based at least in part on a measurement associated with the first cell satisfying a cell selection condition. The processor-readable code, when executed by the at least one processor, may be configured to cause the user equipment to camp on the first cell. The processor-readable code, when executed by the at least one processor, may be configured to cause the user equipment to detect that a reselection condition is satisfied for the first cell, the reselection condition being based at least in part on one or more factors. The processor-readable code, when executed by the at least one processor, may be configured to cause the user equipment to camp on a second cell based at least in part on the one or more factors of the reselection condition.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 6 is a flowchart illustrating an example process performed, for example, by a UE in accordance with the present disclosure.

FIG. 7 is a flowchart illustrating an example process performed, for example, by a UE in accordance with the present disclosure.

DETAILED DESCRIPTION

Figure 1:
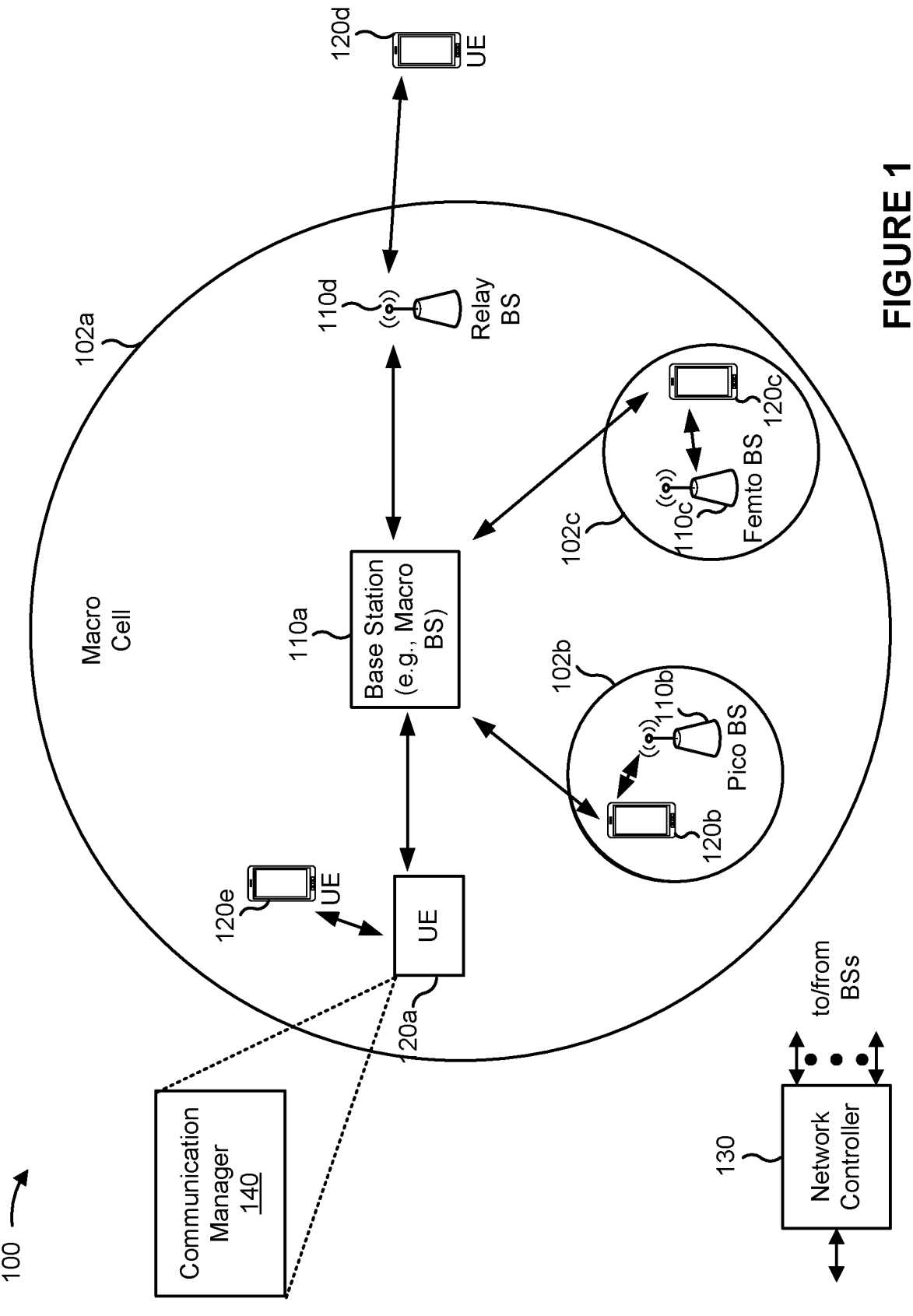
FIG. 1 is a diagram illustrating an example of a wireless network in accordance with the present disclosure.

Various aspects of the disclosure are described more fully hereinafter with reference to the accompanying drawings. This disclosure may however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to cell selection and reselection. Some aspects more specifically relate to selection of a cell using multiple factors. In some aspects, the multiple factors are used to determine a cell score for each cell that is a candidate for selection or reselection. The multiple factors can include a cell selection condition (such as may be associated with a cell selection threshold defined as a reference signal received power (RSRP), reference signal received quality (RSRQ), or signal to interference plus noise ratio (SINR) threshold), as well as one or more other factors described in more detail elsewhere herein. In some aspects, cell selection may be based at least in part on ordering frequencies of an acquisition database based at least in part on frequency scores of the frequencies. Some aspects more specifically relate to reselection using one or more factors of a reselection condition. In some aspects, the one or more factors may be based at least in part on a cell score, as described above. In some aspects, the reselection condition may provide for faster triggering and performance of reselection than a baseline reselection configuration, such as a reselection configuration specified by a wireless communication specification or a reselection configuration based at least in part on a combination of a measurement and a priority level.

Particular aspects of the subject matter described in this disclosure can be implemented to realize one or more of the following potential advantages. In some examples, the described techniques can be used to improve the UE's performance with regard to cell selection and reselection, such as by encouraging the selection of stronger cells (rather than a first-identified suitable cell), cells with suitable bandwidth, cells that are more recently measured, and so on. Thus, throughput may be increased and overhead associated with frequent cell reselection may be reduced. Furthermore, the described techniques for reselection using one or more factors may reduce latency associated with reselection and may increase throughput, since reselection may be triggered more aggressively or quickly than when using a baseline reselection configuration.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station)

may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may perform measurements on a plurality of cells; order the plurality of cells based at least in part on multiple factors including at least a cell selection condition, the cell selection condition indicating a threshold for the measurement for cell selection; select, based at least in part on the ordering, a cell from the plurality of cells; and camp on the selected cell. In some aspects, the communication manager 140 may select a first cell for camping based at least in part on a measurement associated with the first cell satisfying a cell selection condition; camp on the first cell; detect that a reselection condition is satisfied for the first cell, the reselection condition being based at least in part on one or more factors; and camp on a second cell based at least in part on the one or more factors of the reselection condition. Additionally or alternatively, the communication manager 140 may perform one or more other operations described herein.

Figure 2:
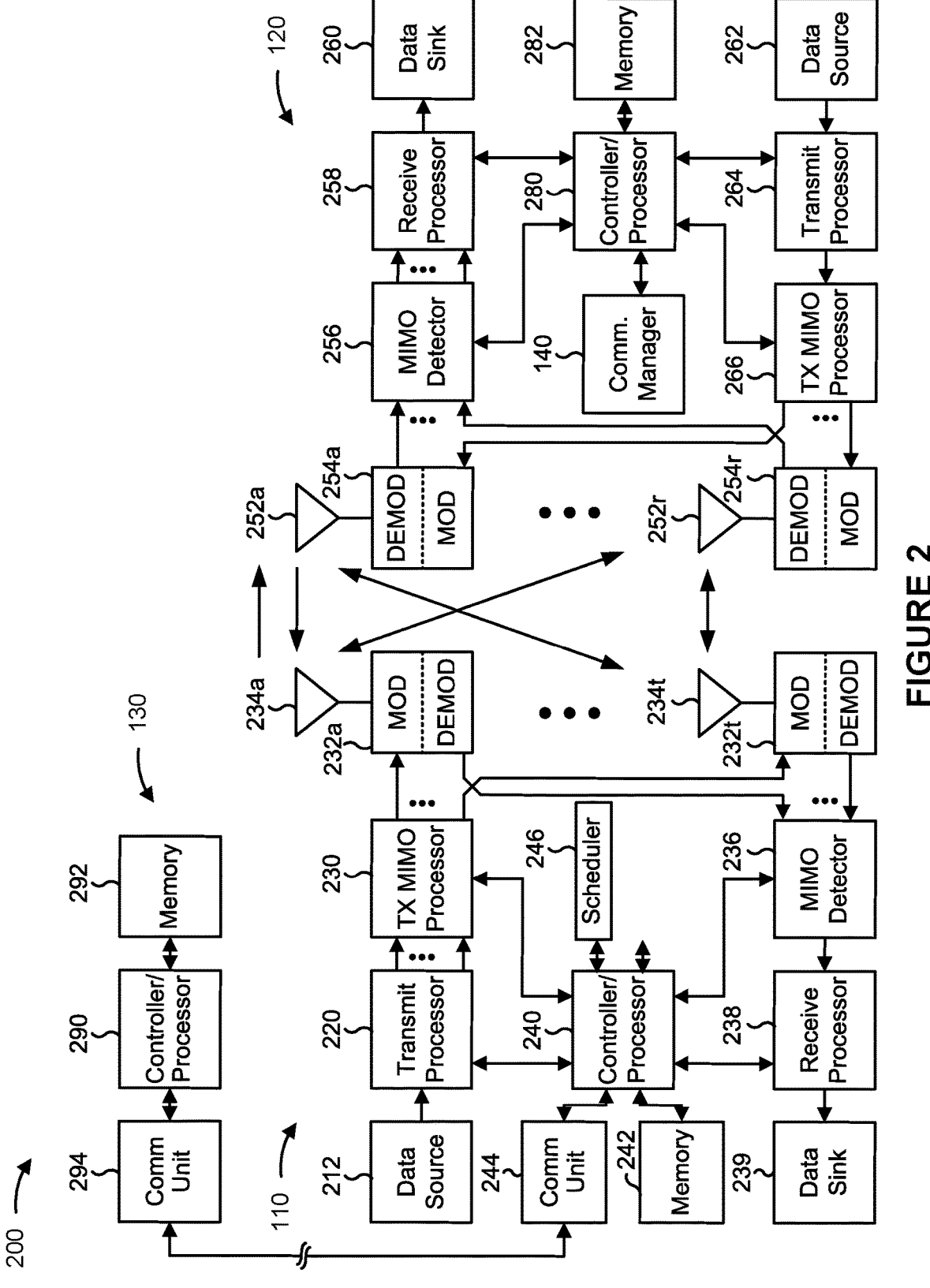
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with cell selection using multiple factors, as described in more detail elsewhere herein. For example, the controller/processor 240 of the base station 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions, among other examples.

In some aspects, the UE includes means for performing measurements on a plurality of cells; means for ordering the plurality of cells based at least in part on multiple factors including at least a cell selection condition, the cell selection condition indicating a threshold for the measurement for cell selection; means for selecting, based at least in part on the ordering, a cell from the plurality of cells; and means for camping on the selected cell. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for selecting a first cell for camping based at least in part on a measurement associated with the first cell satisfying a cell selection condition; means for camping on the first cell; means for detecting that a reselection condition is satisfied for the first cell, the reselection condition being based at least in part on one or more factors; and means for camping on a second cell based at least in part on the one or more factors of the reselection condition. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Various aspects relate generally to cell selection and reselection. Some aspects more specifically relate to selection of a cell using multiple factors. In some aspects, the multiple factors are used to determine a cell score for each cell that is a candidate for selection or reselection. The multiple factors can include a cell selection condition (such as a reference signal received power (RSRP), reference signal received quality (RSRQ), or signal to interference plus noise ratio (SINR) threshold), as well as one or more other factors described in more detail elsewhere herein. In some aspects, cell selection may be based at least in part on ordering frequencies of an acquisition database based at least in part on frequency scores of the frequencies. Some aspects more specifically relate to reselection using one or more factors of a reselection condition. In some aspects, the one or more factors may be based at least in part on a cell score, as described above. In some aspects, the reselection condition may provide for faster triggering and performance of reselection than a baseline reselection configuration, such as one specified by a wireless communication specification or one based at least in part on a combination of a measurement and a priority level.

Particular aspects of the subject matter described in this disclosure can be implemented to realize one or more of the following potential advantages. In some examples, the described techniques can be used to improve the UE's performance with regard to cell selection and reselection, such as by encouraging the selection of stronger cells (rather than a first-identified suitable cell), cells with suitable bandwidth, cells that are more recently measured, and so on. Thus, throughput may be increased and overhead associated with frequent cell reselection may be reduced. Furthermore, the described techniques for reselection using one or more factors may reduce latency associated with reselection and may increase throughput, since reselection may be triggered more aggressively or quickly than when using a baseline reselection configuration.

Figure 3:
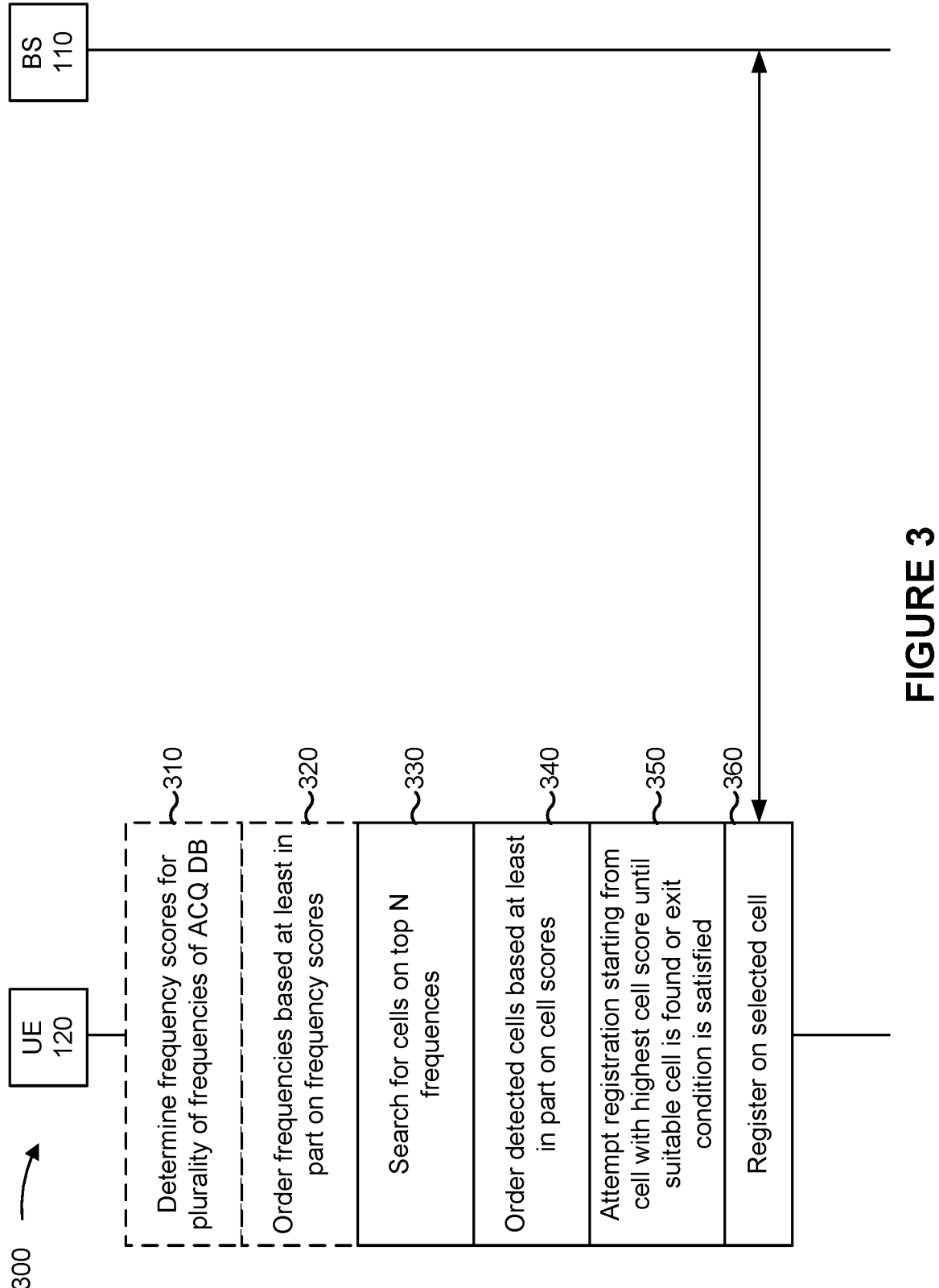
FIG. 3 is a diagram illustrating an example of cell selection and reselection using cell scores.

FIG. 3 is a diagram illustrating an example 300 of cell selection and reselection using cell scores in accordance with the present disclosure. FIG. 3 includes a UE 120 and a base station 110. The UE 120 may be associated with an acquisition database (sometimes abbreviated "ACQ DB"). An acquisition database may indicate a set of frequencies for a cell search. The UE 120 may perform measurements on frequencies identified by the acquisition database to identify a suitable cell on which to camp. A UE that has selected a cell and that is monitoring the control channel of the cell is said to be "camped" on the cell. In some aspects, frequencies identified by the acquisition database may be associated with a recent camping. For example, the acquisition database may identify a set of frequencies associated with one or more cells on which the UE 120 camped within a time window (such as a most recent camp, a most recent X camps, or any camping within a given time window).

In a first operation 310, the UE 120 may optionally determine frequency scores for a plurality of frequencies of the acquisition database. A frequency score is a score used to order a plurality of frequencies of an acquisition database. A frequency score may be based at least in part on multiple factors. Examples of such factors are provided, and described in more detail, in connection with FIG. 5. For example, a frequency score may be based at least in part on a cell selection condition (such as an RSRP/RSRQ/SINR threshold for measurement for cell selection) and one or more other factors. Generally, a frequency score may cause the UE 120 to prioritize a set of frequencies for cell selection. For example, the UE 120 may perform a cell search on frequencies of the acquisition database in an order corresponding to frequency scores of the frequencies. In some aspects, the UE 120 may perform a cell search on a subset of frequencies of the acquisition database, such as a first N frequencies.

In a second operation 320, the UE 120 may optionally order the plurality of frequencies based at least in part on the frequency scores. For example, the UE 120 may rank the plurality of frequencies such that a frequency associated with a highest score is searched first, a frequency associated with a second-highest score is searched second, and so on.

In some aspects, the UE 120 may determine frequency scores and may order the plurality of frequencies periodically. In some aspects, the UE 120 may be triggered to determine frequency scores and order the plurality of frequencies, such as by the base station 110. In some aspects, the UE 120 may determine the frequency scores and order the plurality of frequencies prior to (such as in anticipation of) performing cell selection.

In a third operation 330, the UE 120 may search for cells on a top N frequencies of the acquisition database, where N is an integer. In just one example, N may be equal to 5. N may be adjustable, such as via configuration signaling or by a UE determination. In some aspects, N may be selected so that a camping time (such as a time associated with cell selection and camping) is not unduly extended. To search for cells, the UE 120 may perform measurements on the top N frequencies. The measurements may include, for example, RSRP measurements, RSRQ measurements, SINR measurements, or another form of measurement. The UE 120 may detect one or more cells. In this example, the UE 120 detects a plurality of cells. The UE 120 may detect a cell when the measurement associated with the cell satisfies one or more thresholds, such as an Srxlev threshold (which is a cell selection receive level value in dB) and an Squal threshold (which is a cell selection quality value in dB).

In a fourth operation 340, the UE 120 may order detected cells based at least in part on cell scores of the detected cells. For example, the UE 120 may determine cell scores of the detected cells based at least in part on multiple factors. The multiple factors may include a cell selection condition (such as a condition associated with an Srxlev threshold or an Squal threshold), which may be used to identify the plurality of cells to be ordered, and one or more other factors. Examples of multiple factors, and the determination of the cell scores, are described in more detail in connection with FIG. 5. The UE 120 may use the cell scores to prioritize cells for cell selection or reselection. For example, the UE 120 may order the detected cells based at least in part on their cell scores, and may attempt to camp on a cell with a highest cell score, then a cell with a second-highest cell score (if camping on the cell with the highest cell score fails), and so on.

The determination of the cell scores, and the ordering of the detected cells in accordance with the cell scores, may enable the UE 120 to prioritize camping on cells that may provide improved performance relative to a cell selected in accordance with a baseline approach, such as a cell associated with a most recent camping. For example, in some aspects, the cell score may be based at least in part on a strength associated with the measurement. In this scenario, the cell score may cause the UE 120 to prioritize cells associated with a higher measurement, whereas a baseline approach might consider any cell that satisfies the one or more thresholds for cell selection (such as Srxlev and Squal). As another example, in some aspects, the cell score may be based at least in part on a bandwidth (where a wider bandwidth is associated with a more favorable cell score). In this scenario, the cell score may cause the UE 120 to prioritize cells associated with a wider bandwidth, which may provide improved throughput. As yet another example, in some aspects, the cell score may be based at least in part on a recency of a measurement (that is, a length of time since a most recent measurement for a cell). In this scenario, the cell score may cause the UE 120 to prioritize cells associated with a more recent measurement that satisfies a threshold, which may lead to selection of a cell that is likely to remain acceptable for at least the near term.

In a fifth operation 350, the UE 120 may attempt camping on one or more detected cells. For example, the UE 120 may attempt to camp on one or more detected cells in accordance with the order of the detected cell. In some aspects, the UE 120 may attempt to camp on a first detected cell associated with a highest cell score (that is, a cell with a most favorable cell score). If camping is unsuccessful on the first detected cell, then the UE 120 may attempt to camp on a second detected cell associated with a second-highest cell score. The UE 120 may continue to attempt camping on detected cells in accordance with the cell scores until the UE 120 successfully camps on a cell.

In some aspects, the UE 120 may camp on a detected cell based at least in part on an exit condition. An exit condition indicates a condition for selecting a cell prior to determining all cell scores of a plurality of cells. If the exit condition is satisfied for a cell, the UE 120 may select the cell for camping. For example, the UE 120 may select a cell for which an exit condition is satisfied before determining cell scores for all of the selected cells. As another example, the UE 120 may select a cell for which an exit condition is satisfied before attempting to camp on each cell associated with a higher cell score than the cell for which the exit condition is satisfied. In some aspects, the exit condition may be associated with a threshold. For example, the exit condition may be associated with a threshold for one or more factors associated with the cell score. In some aspects, the threshold may be higher than the one or more thresholds for cell selection (such as Srxlev and Squal). As just one example, the threshold for the exit condition may be an RSRP of at least −80 dBm.

In a sixth operation 360, the UE 120 may camp on a selected cell. For example, the UE 120 may monitor a control channel on the selected cell. In some aspects, the UE 120 may transmit a registration message to the base station 110 associated with the selected cell. The UE 120 may receive a registration accept message from the base station 110.

Figure 4:
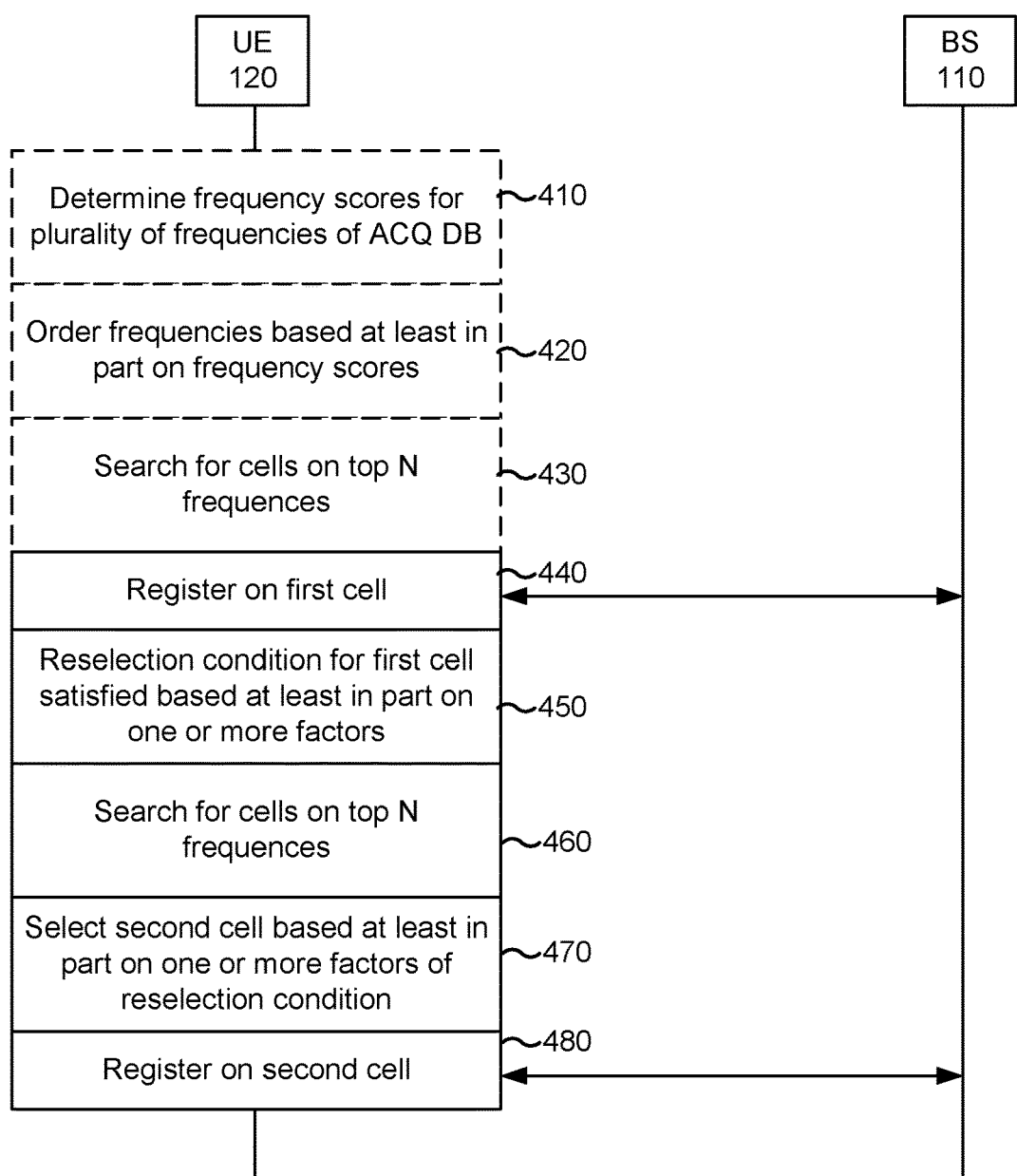
FIG. 4 is a diagram illustrating an example of cell reselection using one or more factors in accordance with the present disclosure.

FIG. 4 is a diagram illustrating an example 400 of cell reselection using one or more factors in accordance with the present disclosure. FIG. 4 includes a UE 120 and a base station 110. The UE 120 may be associated with an acquisition database, as described elsewhere herein.

In a first operation 410, the UE 120 may optionally determine frequency scores for a plurality of frequencies of the acquisition database. For example, the UE 120 may determine the frequency scores as described with respect to the first operation 310 of FIG. 3, such as based at least in part on one or more factors described in connection with FIG. 5. In a second operation 420, the UE 120 may optionally order the plurality of frequencies based at least in part on the frequency scores, as described with respect to the second operation 320 of FIG. 3.

In a third operation 430, the UE 120 may search for a cell based at least in part on the acquisition database. For example, the UE 120 may search a first frequency in the acquisition database to identify a cell. If the UE 120 does not identify a cell on the first frequency, then the UE 120 search a second frequency in the acquisition database to identify a cell, and so on.

In some aspects, the UE 120 may optionally search for cells on a top N frequencies of the acquisition database. For example, the UE 120 may search for cells on a top N frequencies of the acquisition database, where N is an integer. In some aspects, N may be selected so that a camping time (such as a time associated with cell selection and camping) is not unduly extended. To search for cells, the UE 120 may perform measurements on the top N frequencies. The measurements may include, for example, RSRP measurements, RSRQ measurements, SINR measurements, or another form of measurement. The UE 120 may detect one or more cells. In this example, the UE 120 detects a plurality of cells. The UE 120 may detect a cell when the measurement associated with the cell satisfies one or more thresholds, such as an Srxlev threshold and an Squal threshold. In a fourth operation 440, the UE 120 may camp on a first cell. For example, the UE 120 may select the first cell based at least in part on the one or more thresholds and based at least in part on a priority associated with the first cell. The UE 120 may camp on the first cell based at least in part on a registration accept message received from the base station 110. In some aspects, the UE 120 may register on the first cell based at least in part on the first cell being a first suitable cell as identified based at least in part on the acquisition database.

In a fifth operation 450, the UE 120 may determine that a reselection condition for the first cell is satisfied based at least in part on one or more factors. The one or more factors may include any one or more of the factors described in connection with FIG. 5. For example, the one or more factors may include an RSRP threshold. If a measurement associated with the first cell fails to satisfy the RSRP threshold, then the UE 120 may determine that the reselection condition for the first cell is satisfied. In some aspects, the reselection condition may be based at least in part on a cell score. For example, the UE 120 may determine a cell score for the first cell, as described in connection with the fourth operation 340 of FIG. 3. If the cell score fails to satisfy a threshold, then the UE 120 may determine that the reselection condition for the first cell is satisfied.

In a sixth operation 460, the UE 120 may search for cells. For example, the UE 120 may search for cells among one or more neighbors that are configured in system information (such as system information block (SIB) 3, SIB 4, or SIB 5). In some aspects, the UE 120 may search for cells on a top N frequencies of the acquisition database. For example, the UE 120 may perform measurements on the top N frequencies to identify one or more cells. In some aspects, the UE 120 may reuse measurements from the cell search described with regard to the third operation 430. In some other aspects, the UE 120 may perform separate measurements for the third operation 430 and the sixth operation 460.

In a seventh operation 470, the UE 120 may select a second cell based at least in part on the one or more factors of the reselection condition. For example, the UE 120 may select the second cell based at least in part on a threshold for cell selection (or cell reselection) associated with the one or more factors. In some aspects, the one or more factors may be the same for the determination that the reselection condition is satisfied (as described with regard to the fifth operation 450) and the selection of the second cell. For example, if the determination that the reselection condition is satisfied is based at least in part on an RSRP, then the selection of the second cell may also be based at least in part on an RSRP. As another example, if the determination that the reselection condition is satisfied is based at least in part on a cell score of the first cell, then the selection of the second cell may be based at least in part on a cell score of the second cell. By using the same one or more factors for the determination that the reselection condition is satisfied and the selection of the second cell, the UE 120 may select a second cell that mediates an issue that leads to reselection.

For example, if the reselection is triggered due to a low bandwidth (as reflected in a cell score of the first cell), the second cell may be associated with a larger bandwidth than the first cell (as reflected in a cell score of the second score). In some aspects, the one or more factors may be different for the determination that the reselection condition is satisfied than for the selection of the second cell.

In an eighth operation 480, the UE 120 may register on the second cell. For example, the UE 120 may transmit a registration message to the base station 110 associated with the second cell (which may be the same as or different than the base station 110 associated with the first cell). The UE 120 may receive a registration accept message from the base station 110. The UE 120 may camp on the second cell based at least in part on receiving the registration accept message.

Figure 5:
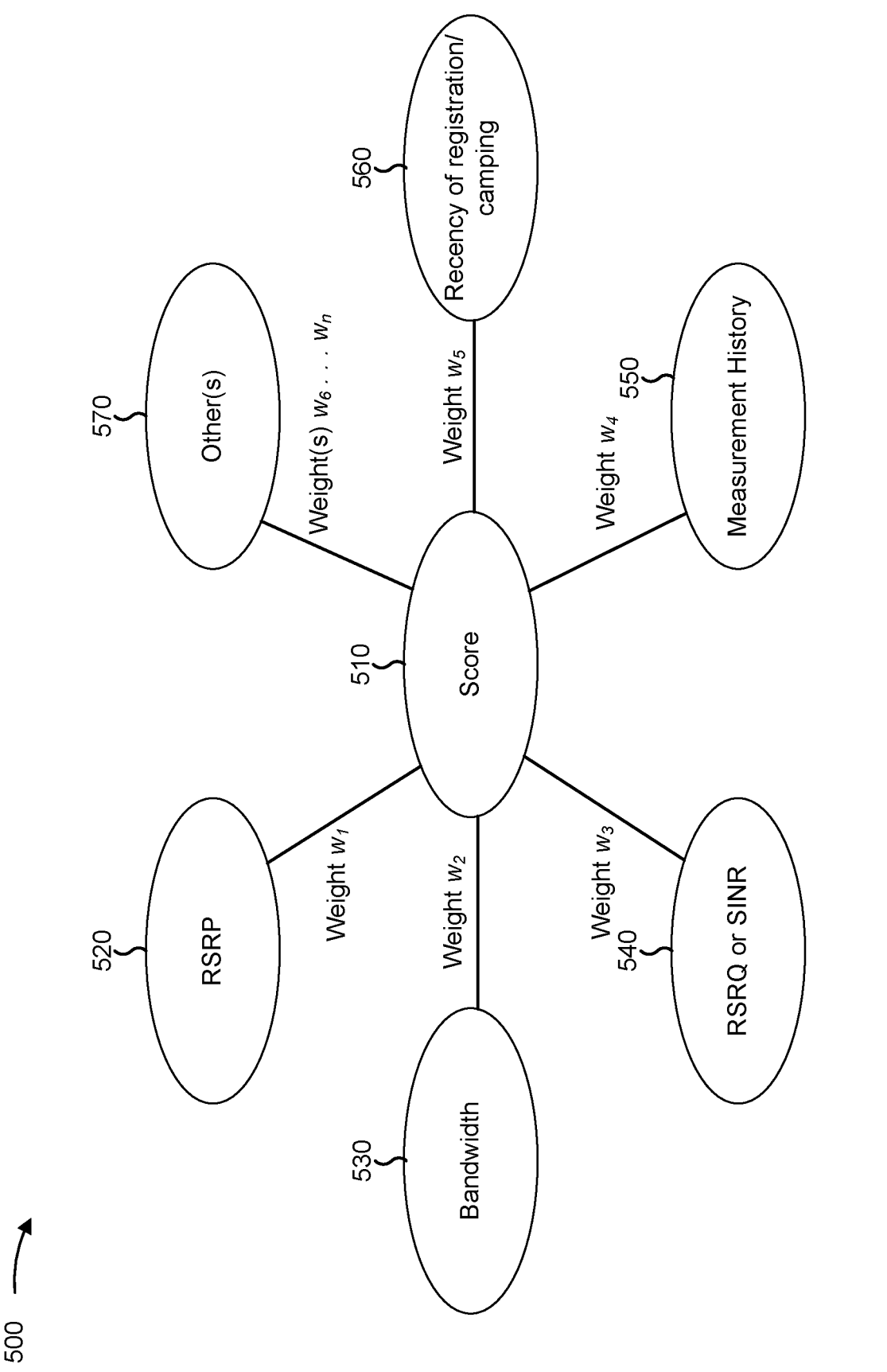
FIG. 5 is a diagram illustrating an example of determining a score such as a cell score or a frequency score in accordance with the present disclosure.

FIG. 5 is a diagram illustrating an example 500 of determining a score 510 such as a cell score or a frequency score in accordance with the present disclosure. The score 510 may be based at least in part on any combination of one or more of factors 520, 530, 540, 550, 560, and 570. For example, the score 510 may be based at least in part on one or more of these factors. In some aspects, each factor may be associated with a respective weight $w_i$, where each $w_i$ is between 0 and 1. The score 510 may be a function of a value of each factor, such as a combination of each factor. For example, the score 510 may be based at least in part on a weighted average of the factors, a ratio of two of factors (e.g., RSRP divided by bandwidth, or the like. In some aspects, the score 510 may be based at least in part on a normalized factor. For example, the UE 120 may normalize a measurement using a value of the measurement divided by a range of the measurement, and then use may this normalized value in the combination of the factors used to determine the score 510.

In some aspects, the same set of factors may be used to determine a cell score and a frequency score. In some aspects, different sets of factors may be used to determine a cell score and a frequency score.

The factor 520 may be based at least in part on an RSRP. For example, the factor 520 may be based at least in part on an RSRP measurement for a given cell, such as a measurement associated with the third operation 330, the third operation 430, or the sixth operation 460. In some aspects, a higher RSRP measurement (indicating a higher received power and thus better coverage) may lead to a more favorable score 510. The factor 520 may be associated with a weight $w_1$.

The factor 530 may be based at least in part on a bandwidth. For example, the factor 530 may be based at least in part on a bandwidth of a given cell, such that a larger bandwidth leads to a more favorable score 510. The factor 530 may be associated with a weight $w_2$.

The factor 540 may be based at least in part on a quality measurement, such as an RSRQ or an SINR. For example, the factor 520 may be based at least in part on an RSRQ or SINR measurement for a given cell, such that a higher RSRQ or SINR leads to a more favorable score 510. The factor 540 may be associated with a weight $w_3$.

The factor 550 may be based at least in part on a measurement history. For example, the factor 550 may be based at least in part on a most recent measurement for a given cell or a most recent set of measurements for a given cell. As another example, the factor 550 may weight more recent measurements more heavily than older measurements. As still another example, the factor 550 may be based at least in part on a trend in a measurement. For example, the factor 550 may lead to a more favorable score 510 when a cell's measurement value is associated with a trend to become stronger over time than when a cell's measurement value is associated with a trend to become weaker over time. The factor 550 may be associated with a weight $w_4$.

The factor 560 may be based at least in part on a recency of camping (that is, registration). For example, the factor 560 may be based at least in part on how recently (and if) the UE 120 has camped on a given cell. The factor 560 may lead to a more favorable score 510 when the UE 120 has camped on a cell more recently than when the UE 120 has not camped on a cell or has not recently camped on the cell. The factor 560 may be associated with a weight $w_5$.

In some aspects, the score 510 may be based at least in part on one or more other factors 570, which may be associated with weights $w_6$ through $w_n$ (if any factors 570 are used). As one example, a factor 570 may include a purpose of cell selection. For example, the factor 570 (and thus the score 510) may be based at least in part on whether the cell selection is for initial acquisition, reestablishment, or direction. In some aspects, the UE 120 may adjust one or more other weights (of the weights $w_1$ through $w_5$) based at least in part on the factor 570.

FIG. 6 is a flowchart illustrating an example process 600 performed, for example, by a UE in accordance with the present disclosure. Example process 600 is an example where the UE (for example, UE 120) performs operations associated with cell selection using multiple factors.

As shown in FIG. 6, in some aspects, process 600 may include performing measurements on a plurality of cells (block 610). For example, the UE (such as by using communication manager 140 or measurement component 808, depicted in FIG. 8) may perform measurements on a plurality of cells, as described above.

As further shown in FIG. 6, in some aspects, process 600 may include ordering the plurality of cells based at least in part on multiple factors including at least a cell selection condition, the cell selection condition indicating a threshold for the measurement for cell selection (block 620). For example, the UE (such as by using communication manager 140 or cell scoring component 810, depicted in FIG. 8) may order the plurality of cells based at least in part on multiple factors including at least a cell selection condition, the cell selection condition indicating a threshold for the measurement for cell selection, as described above.

As further shown in FIG. 6, in some aspects, process 600 may include selecting, based at least in part on the ordering, a cell from the plurality of cells (block 630). For example, the UE (such as by using communication manager 140 or cell selection component 812, depicted in FIG. 8) may select, based at least in part on the ordering, a cell from the plurality of cells, as described above.

As further shown in FIG. 6, in some aspects, process 600 may include camping on the selected cell (block 640). For example, the UE (such as by using communication manager 140 or camping component 814, depicted in FIG. 8) may camp on the selected cell, as described above.

Process 600 may include additional aspects, such as any single aspect or any combination of aspects described below or in connection with one or more other processes described elsewhere herein.

In a first additional aspect, each cell of the plurality of cells is associated with one of a set of prioritized frequencies that are prioritized for cell selection.

In a second additional aspect, alone or in combination with the first aspect, process 600 includes identifying the set of prioritized frequencies based at least in part on at least one of a measurement history, or a history of camping associated with the set of prioritized frequencies.

In a third additional aspect, alone or in combination with one or more of the first and second aspects, process 600 includes identifying the set of prioritized frequencies based at least in part on at least one of the multiple factors.

In a fourth additional aspect, alone or in combination with one or more of the first through third aspects, the multiple factors include one or more of a reference signal received power, a bandwidth, a reference signal received quality measurement, a signal to interference plus noise ratio measurement, a measurement history, a history of camping, or a purpose of cell selection.

In a fifth additional aspect, alone or in combination with one or more of the first through fourth aspects, ordering the plurality of cells further comprises ordering the plurality of cells based at least in part on at least one of a weighted combination of the multiple factors or a ratio of the multiple factors.

In a sixth additional aspect, alone or in combination with one or more of the first through fifth aspects, process 600 includes identifying the plurality of cells from an acquisition database of the UE.

In a seventh additional aspect, alone or in combination with one or more of the first through sixth aspects, the measurements are reference signal received power (RSRP) measurements.

In an eighth additional aspect, alone or in combination with one or more of the first through seventh aspects, ordering the plurality of cells further comprises ordering the plurality of cells based at least in part on respective scores of the plurality of cells determined using the multiple factors.

In a ninth additional aspect, alone or in combination with one or more of the first through eighth aspects, the selected cell is associated with a highest score of the respective scores.

In a tenth additional aspect, alone or in combination with one or more of the first through ninth aspects, selecting the cell further comprises selecting the cell based at least in part on a score, of the respective scores, associated with the selected cell and based at least in part on a factor, of the multiple factors, satisfying a threshold with regard to the selected cell.

In an eleventh additional aspect, alone or in combination with one or more of the first through tenth aspects, each cell of the plurality of cells satisfies the cell selection condition based at least in part on the measurements.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

FIG. 7 is a flowchart illustrating an example process 700 performed, for example, by a UE in accordance with the present disclosure. Example process 700 is an example where the UE (for example, UE 120) performs operations associated with cell selection using multiple factors.

As shown in FIG. 7, in some aspects, process 700 may include selecting a first cell for camping based at least in part on a measurement associated with the first cell satisfying a cell selection condition (block 710). For example, the UE (such as by using communication manager 140 or cell selection component 812, depicted in FIG. 8) may select a first cell for camping based at least in part on a measurement associated with the first cell satisfying a cell selection condition, as described above.

As further shown in FIG. 7, in some aspects, process 700 may include camping on the first cell (block 720). For example, the UE (such as by using communication manager 140 or camping component 814, depicted in FIG. 8) may camp on the first cell, as described above.

As further shown in FIG. 7, in some aspects, process 700 may include detecting that a reselection condition is satisfied for the first cell, the reselection condition being based at least in part on one or more factors (block 730). For example, the UE (such as by using communication manager 140 or reselection component 816, depicted in FIG. 8) may detect that a reselection condition is satisfied for the first cell, the reselection condition being based at least in part on one or more factors, as described above.

As further shown in FIG. 7, in some aspects, process 700 may include camping on a second cell based at least in part on the one or more factors of the reselection condition (block 740). For example, the UE (such as by using communication manager 140 or camping component 814, depicted in FIG. 8) may camp on a second cell based at least in part on the one or more factors of the reselection condition, as described above.

Process 700 may include additional aspects, such as any single aspect or any combination of aspects described below or in connection with one or more other processes described elsewhere herein.

In a first additional aspect, the first cell and the second cell are associated with a set of prioritized frequencies that are prioritized for cell selection.

In a second additional aspect, alone or in combination with the first aspect, process 700 includes identifying the set of prioritized frequencies based at least in part on at least one of a measurement history, or a history of camping associated with the set of prioritized frequencies.

In a third additional aspect, alone or in combination with one or more of the first and second aspects, process 700 includes identifying the set of prioritized frequencies based at least in part on at least one of the one or more factors.

In a fourth additional aspect, alone or in combination with one or more of the first through third aspects, the one or more factors include at least one of a bandwidth, a reference signal received power measurement, a reference signal received quality measurement, a signal to interference plus noise ratio measurement, a measurement history, a history of camping, or a purpose of cell selection.

In a fifth additional aspect, alone or in combination with one or more of the first through fourth aspects, detecting that the reselection condition is satisfied for the first cell comprises determining that a first score associated with the first cell fails to satisfy a threshold, and camping on the second cell comprises camping on the second cell based at least in part on a second score associated with the second cell satisfying the threshold, wherein the first score and the second score are based at least in part on the one or more factors.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
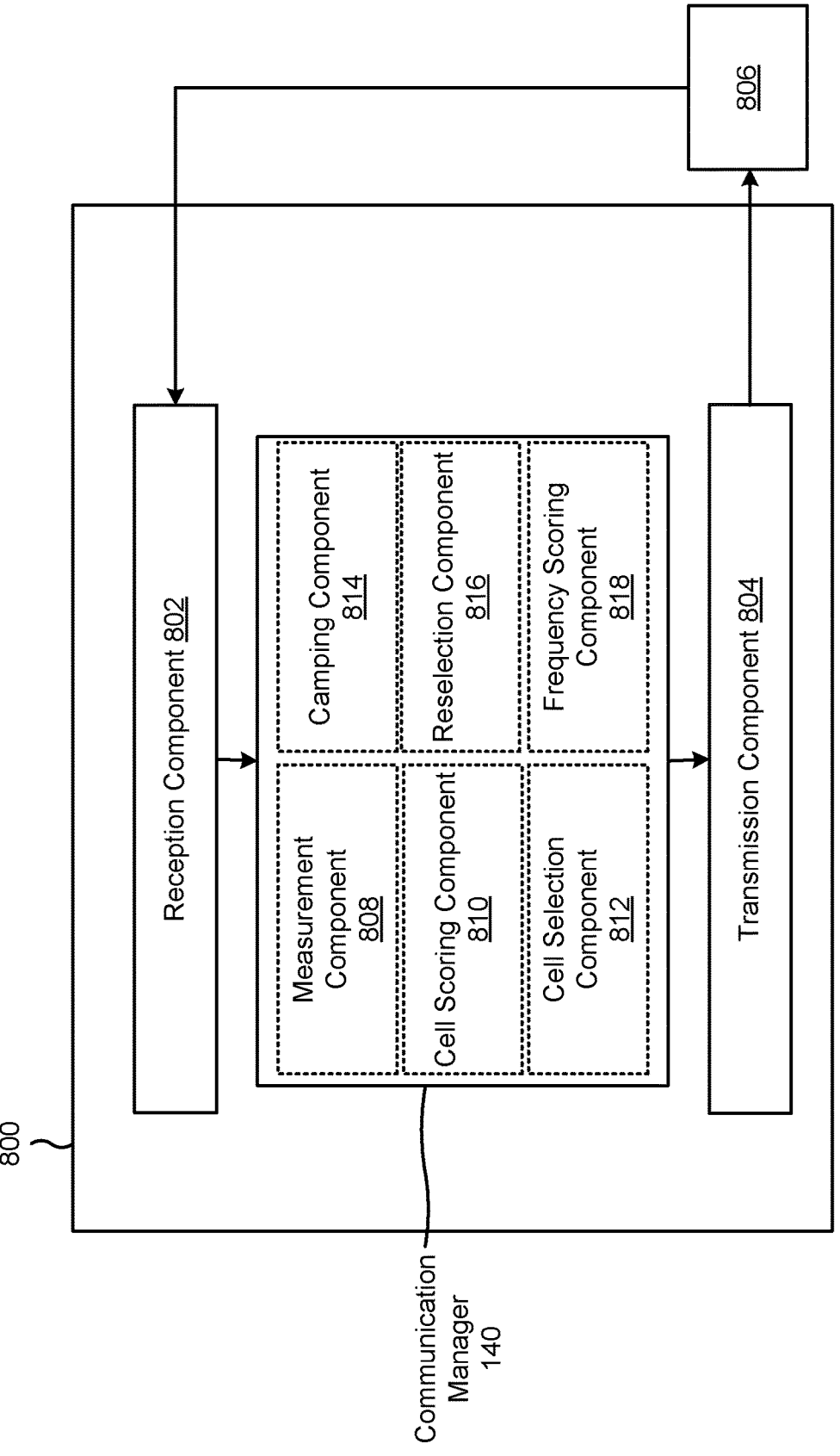
FIGS. 8 and 9 are diagrams of example apparatuses for wireless communication in accordance with the present disclosure.

FIG. 8 is a diagram of an example apparatus 800 for wireless communication in accordance with the present disclosure. The apparatus 800 may be a UE, or a UE may include the apparatus 800. In some aspects, the apparatus 800 includes a reception component 802, a transmission component 804, and a communication manager 140, which may be in communication with one another (for example, via one or more buses). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIGS. 3-5. Additionally or alternatively, the apparatus 800 may be configured to perform one or more processes described herein, such as process 600 of FIG. 6, process 700 of FIG. 7, or a combination thereof. In some aspects, the apparatus 800 may include one or more components of the UE described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 140. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, the communication manager 140 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

In some aspects, the communication manager 140 may perform measurements on a plurality of cells. The communication manager 140 may order the plurality of cells based at least in part on multiple factors including at least a cell selection condition, the cell selection condition indicating a threshold for the measurement for cell selection. The communication manager 140 may select, based at least in part on the ordering, a cell from the plurality of cells. The communication manager 140 may camp on the selected cell. In some aspects, the communication manager 140 may perform one or more operations described elsewhere herein as being performed by one or more components of the communication manager 140.

In some aspects, the communication manager 140 may select a first cell for camping based at least in part on a measurement associated with the first cell satisfying a cell selection condition. The communication manager 140 may camp on the first cell. The communication manager 140 may detect that a reselection condition is satisfied for the first cell, the reselection condition being based at least in part on one or more factors. The communication manager 140 may camp on a second cell based at least in part on the one or more factors of the reselection condition. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a measurement component 808, a cell scoring component 810, a cell selection component 812, a camping component 814, a reselection component 816, a frequency scoring component 818, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The measurement component 808 may perform measurements on a plurality of cells. The cell scoring component 810 may order the plurality of cells based at least in part on multiple factors including at least a cell selection condition, the cell selection condition indicating a threshold for the measurement for cell selection. The cell selection component 812 may select, based at least in part on the ordering, a cell from the plurality of cells. The camping component 814 may camp on the selected cell. The frequency scoring component 818 may assign frequency scores to a set of frequencies, such as identified by an acquisition database, for a cell search.

In some aspects, the cell selection component 812 may select a first cell for camping based at least in part on a measurement associated with the first cell satisfying a cell selection condition. The camping component 814 may camp on the first cell. The reselection component 816 may detect that a reselection condition is satisfied for the first cell, the reselection condition being based at least in part on one or more factors. The camping component 814 may camp on a second cell based at least in part on the one or more factors of the reselection condition.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
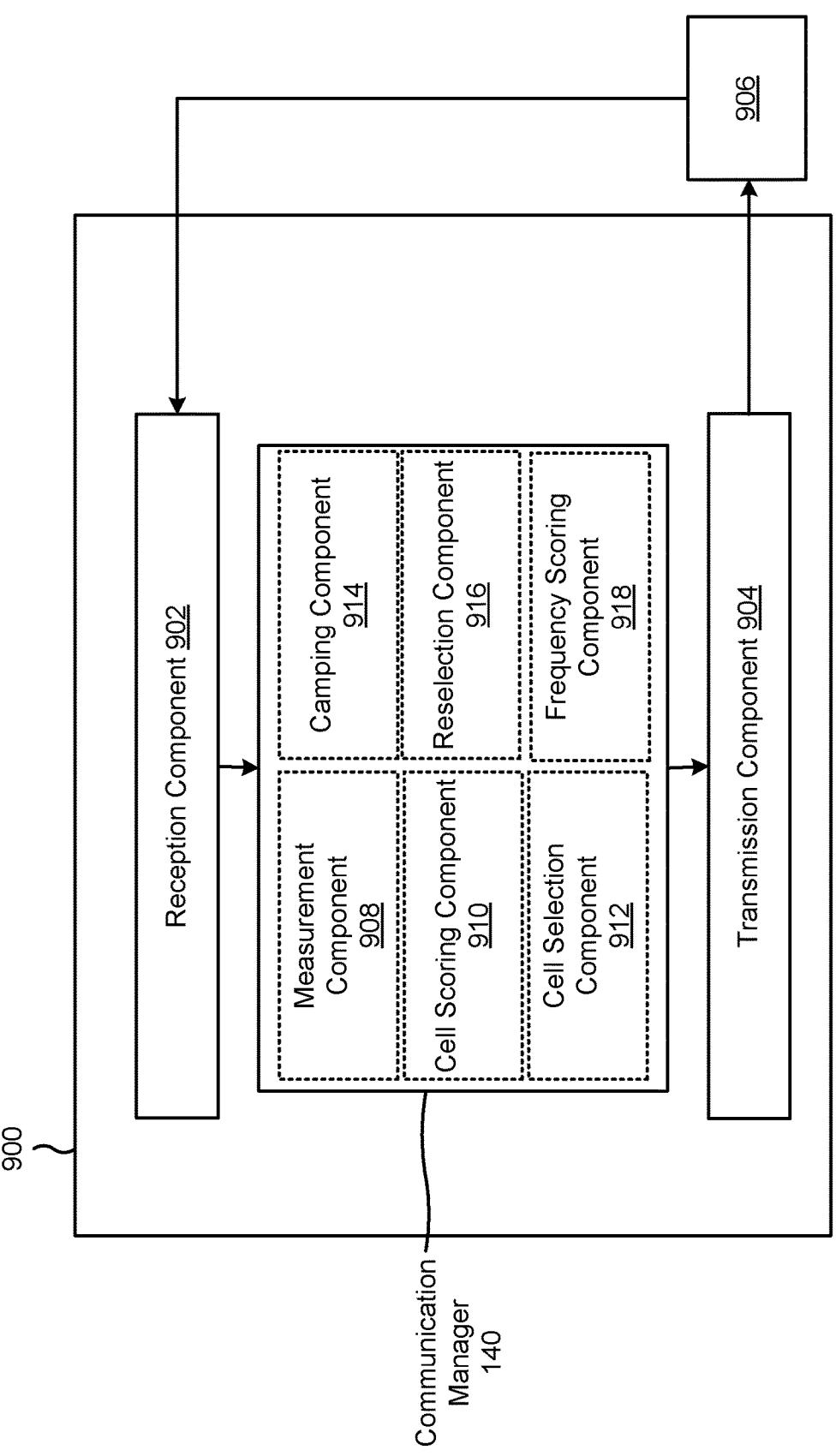

FIG. 9 is a diagram of an example apparatus 900 for wireless communication in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 3-5. Additionally or alternatively, the apparatus 900 may be configured to perform one or more processes described herein, such as process 600 of FIG. 6, process 700 of FIG. 7, or a combination thereof. In some aspects, the apparatus 900 may include one or more components of the UE described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

In some aspects, the communication manager 140 may perform measurements on a plurality of cells. The communication manager 140 may order the plurality of cells based at least in part on multiple factors including at least a cell selection condition, the cell selection condition indicating a threshold for the measurement for cell selection. The communication manager 140 may select, based at least in part on the ordering, a cell from the plurality of cells. The communication manager 140 may camp on the selected cell. In some aspects, the communication manager 140 may perform one or more operations described elsewhere herein as being performed by one or more components of the communication manager 140.

In some aspects, the communication manager 140 may select a first cell for camping based at least in part on a measurement associated with the first cell satisfying a cell selection condition. The communication manager 140 may camp on the first cell. The communication manager 140 may detect that a reselection condition is satisfied for the first cell, the reselection condition being based at least in part on one or more factors. The communication manager 140 may camp on a second cell based at least in part on the one or more factors of the reselection condition. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a measurement component 908, a cell scoring component 910, a cell selection component 912, a camping component 914, a reselection component 916, a frequency scoring component 918, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the cell selection component 912 may select a first cell for camping based at least in part on a measurement (determined by the measurement component 908) associated with the first cell satisfying a cell selection condition. The camping component 914 may camp on the first cell. The reselection component 916 may detect that a reselection condition is satisfied for the first cell, the reselection condition being based at least in part on one or more factors. The camping component 914 may camp on a second cell based at least in part on the one or more factors of the reselection condition. One or more of the reselection condition or the selection of the second cell may be based at least in part on a cell score determined by the cell scoring component 910. The frequency scoring component 818 may assign frequency scores to a set of frequencies, such as identified by an acquisition database, for a cell search.

The number and arrangement of components shown in FIG. 9 are provided as an example. In practice, there may be additional components, fewer components, different components, or differently arranged components than those shown in FIG. 9.

Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: performing measurements on a plurality of cells; ordering the plurality of cells based at least in part on multiple factors including at least a cell selection condition, the cell selection condition indicating a threshold for the measurement for cell selection; selecting, based at least in part on the ordering, a cell from the plurality of cells; and camping on the selected cell.

Aspect 2: The method of Aspect 1, wherein each cell of the plurality of cells is associated with one of a set of prioritized frequencies that are prioritized for cell selection.

Aspect 3: The method of Aspect 2, further comprising: identifying the set of prioritized frequencies based at least in part on at least one of: a measurement history, or a history of camping associated with the set of prioritized frequencies.

Aspect 4: The method of Aspect 2, further comprising identifying the set of prioritized frequencies based at least in part on at least one of the multiple factors.

Aspect 5: The method of any of Aspects 1-4, wherein the multiple factors include one or more of: a reference signal received power, a bandwidth, a reference signal received quality measurement, a signal to interference plus noise ratio measurement, a measurement history, a history of camping, or a purpose of cell selection.

Aspect 6: The method of any of Aspects 1-5, wherein ordering the plurality of cells further comprises ordering the plurality of cells based at least in part on at least one of a weighted combination of the multiple factors or a ratio of the multiple factors.

Aspect 7: The method of any of Aspects 1-6, further comprising identifying the plurality of cells from an acquisition database of the UE.

Aspect 8: The method of any of Aspects 1-7, wherein the measurements are reference signal received power (RSRP) measurements.

Aspect 9: The method of any of Aspects 1-8, wherein ordering the plurality of cells further comprises ordering the plurality of cells based at least in part on respective scores of the plurality of cells determined using the multiple factors.

Aspect 10: The method of Aspect 9, wherein the selected cell is associated with a highest score of the respective scores.

Aspect 11: The method of Aspect 9, wherein selecting the cell further comprises selecting the cell based at least in part on a score, of the respective scores, associated with the selected cell and based at least in part on a factor, of the multiple factors, satisfying a threshold with regard to the selected cell.

Aspect 12: The method of any of Aspects 1-11, wherein each cell of the plurality of cells satisfies the cell selection condition based at least in part on the measurements.

Aspect 13: A method of wireless communication performed by a user equipment (UE), comprising: selecting a first cell for camping based at least in part on a measurement associated with the first cell satisfying a cell selection condition; camping on the first cell; detecting that a reselection condition is satisfied for the first cell, the reselection condition being based at least in part on one or more factors; and camping on a second cell based at least in part on the one or more factors of the reselection condition.

Aspect 14: The method of Aspect 13, wherein the first cell and the second cell are associated with a set of prioritized frequencies that are prioritized for cell selection.

Aspect 15: The method of Aspect 14, further comprising: identifying the set of prioritized frequencies based at least in part on at least one of: a measurement history, or a history of camping associated with the set of prioritized frequencies.

Aspect 16: The method of Aspect 14, further comprising identifying the set of prioritized frequencies based at least in part on at least one of the one or more factors.

Aspect 17: The method of any of Aspects 13-16, wherein the one or more factors include at least one of: a bandwidth, a reference signal received power measurement, a reference signal received quality measurement, a signal to interference plus noise ratio measurement, a measurement history, a history of camping, or a purpose of cell selection.

Aspect 18: The method of any of Aspects 13-17, wherein detecting that the reselection condition is satisfied for the first cell comprises determining that a first score associated with the first cell fails to satisfy a threshold, and wherein camping on the second cell comprises camping on the second cell based at least in part on a second score associated with the second cell satisfying the threshold, wherein the first score and the second score are based at least in part on the one or more factors.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

one or more antennas; and a processing system that includes one or more processors and one or more memories that store code and are coupled with the one or more processors, the processing system configured to cause the UE to:

select a first cell for camping based at least in part on a measurement associated with the first cell satisfying a cell selection condition;

camp on the first cell;

detect that a reselection condition is satisfied for the first cell, the reselection condition being based at least in part on one or more first factors; and camp on a second cell based at least in part on one or more second factors including how recently the UE camped on the second cell, wherein the one or more second factors are associated with a score for the second cell, and wherein a favorability of the score for the second cell is correlated with how recently the UE camped on the second cell.

2. The UE of claim 1, wherein the first cell and the second cell are associated with a set of prioritized frequencies that are prioritized for cell selection.

3. The UE of claim 2, wherein the processing system is further configured to cause the UE to:

identify the set of prioritized frequencies based at least in part on at least one of:

a measurement history, or a recency of camping associated with the set of prioritized frequencies.

4. The UE of claim 2, wherein the processing system is further configured to cause the UE to identify the set of prioritized frequencies based at least in part on at least one of the one or more first factors.

5. The UE of claim 1, wherein the one or more first factors include at least one of:

a bandwidth, a reference signal received power measurement, a reference signal received quality measurement, a signal to interference plus noise ratio measurement, a measurement history, or a purpose of cell selection.

6. The UE of claim 1, wherein to cause the UE to detect that the reselection condition is satisfied for the first cell, the processing system is configured to cause the UE to determine that a first score associated with the first cell fails to satisfy a threshold, wherein the score for the second cell is a second score, and wherein to cause the UE to camp on the second cell, the processing system is configured to cause the UE to camp on the second cell based at least in part on the second score satisfying the threshold.

7. The UE of claim 6, wherein the first score is based at least in part on the one or more first factors and the second score is based at least in part on the one or more second factors.

8. A method of wireless communication performed by a user equipment (UE), comprising:

selecting a first cell for camping based at least in part on a measurement associated with the first cell satisfying a cell selection condition;

camping on the first cell;

detecting that a reselection condition is satisfied for the first cell, the reselection condition being based at least in part on one or more first factors; and camping on a second cell based at least in part on one or more second factors including how recently the UE camped on the second cell, wherein the one or more second factors are associated with a score for the second cell, and wherein a favorability of the score for the second cell is correlated with how recently the UE camped on the second cell.

9. The method of claim 8, wherein the first cell and the second cell are associated with a set of prioritized frequencies that are prioritized for cell selection.

10. The method of claim 9, further comprising:

identifying the set of prioritized frequencies based at least in part on at least one of:

a measurement history, or a recency of camping associated with the set of prioritized frequencies.

11. The method of claim 9, further comprising identifying the set of prioritized frequencies based at least in part on at least one of the one or more first factors.

12. The method of claim 8, wherein the one or more first factors include at least one of:

a bandwidth, a reference signal received power measurement, a reference signal received quality measurement, a signal to interference plus noise ratio measurement, a measurement history, or a purpose of cell selection.

13. The method of claim 8, wherein detecting that the reselection condition is satisfied for the first cell comprises determining that a first score associated with the first cell fails to satisfy a threshold, wherein the score for the second cell is a second score, and wherein camping on the second cell comprises camping on the second cell based at least in part on the second score satisfying the threshold.

14. The method of claim 13, wherein the first score is based at least in part on the one or more first factors and the second score is based at least in part on the one or more second factors.

15. A non-transitory computer-readable medium storing a set of instructions for wireless communication, the set of instructions comprising:

one or more instructions that, when executed by one or more processors of a user equipment (UE), cause the UE to:

select a first cell for camping based at least in part on a measurement associated with the first cell satisfying a cell selection condition;

camp on the first cell;

detect that a reselection condition is satisfied for the first cell, the reselection condition being based at least in part on one or more first factors; and camp on a second cell based at least in part on one or more second factors including how recently the UE camped on the second cell, wherein the one or more second factors are associated with a score for the second cell, and wherein a favorability of the score for the second cell is correlated with how recently the UE camped on the second cell.

16. The non-transitory computer-readable medium of claim 15, wherein the first cell and the second cell are associated with a set of prioritized frequencies that are prioritized for cell selection.

17. The non-transitory computer-readable medium of claim 16, wherein the one or more instructions, when executed by the one or more processors, further cause the UE to:

identify the set of prioritized frequencies based at least in part on at least one of:

a measurement history, or a recency of camping associated with the set of prioritized frequencies.

18. The non-transitory computer-readable medium of claim 16, wherein the one or more instructions, when executed by the one or more processors, further cause the UE to identify the set of prioritized frequencies based at least in part on at least one of the one or more first factors.

19. The non-transitory computer-readable medium of claim 15, wherein the one or more first factors include at least one of:

a bandwidth, a reference signal received power measurement, a reference signal received quality measurement, a signal to interference plus noise ratio measurement, a measurement history, or a purpose of cell selection.

20. The non-transitory computer-readable medium of claim 15, wherein to cause the UE to detect that the reselection condition is satisfied for the first cell, the one or more instructions, when executed by the one or more processors, cause the UE to determine that a first score associated with the first cell fails to satisfy a threshold, wherein the score for the second cell is a second score, and wherein to cause the UE to camp on the second cell, the one or more instructions, when executed by the one or more processors, cause the UE to camp on the second cell based at least in part on the second score satisfying the threshold, wherein the first score is based at least in part on the one or more first factors and the second score is based at least in part on the one or more second factors.

* * * * *